(12) United States Patent
Aoki

(10) Patent No.: US 6,894,954 B2
(45) Date of Patent: May 17, 2005

(54) DOMAIN WALL-DISPLACEMENT TYPE MAGNETO-OPTICAL MEDIUM AND REPRODUCING METHOD FOR THE SAME

(75) Inventor: Yukari Aoki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 10/029,938

(22) Filed: Dec. 31, 2001

(65) Prior Publication Data

US 2002/0106534 A1 Aug. 8, 2002

(30) Foreign Application Priority Data

Jan. 12, 2001 (JP) ........................................ 2001/004851

(51) Int. Cl.[7] .......................................... G11B 11/105
(52) U.S. Cl. .............................. 369/13.44; 369/13.46; 369/13.47; 428/611; 428/409; 428/694 MM; 428/694 EC
(58) Field of Search ................................ 428/611, 409, 428/694 MM, 694 EC; 369/13.44, 13.46, 13.47, 13.52, 13.54, 13.42, 13.43, 13.45

(56) References Cited

U.S. PATENT DOCUMENTS

| | | | | |
|---|---|---|---|---|
| 5,168,482 A | | 12/1992 | Aratani et al. | 369/13 |
| 5,187,694 A | * | 2/1993 | Ichihara et al. | 369/13.38 |
| 5,379,275 A | * | 1/1995 | Kaneko et al. | 369/13.46 |
| 5,621,706 A | | 4/1997 | Kawano et al. | 369/13 |
| 6,027,825 A | | 2/2000 | Shiratori et al. | 428/694 ML |
| 6,096,444 A | * | 8/2000 | Tamanoi et al. | 428/694 ML |
| 6,122,229 A | * | 9/2000 | Yonezawa | 369/13.08 |
| 6,128,254 A | * | 10/2000 | Matsumoto et al. | 369/13.46 |
| 6,150,038 A | | 11/2000 | Hirokane et al. | 428/638 |
| 6,221,219 B1 | * | 4/2001 | Hashimoto et al. | 204/192.2 |
| 6,455,174 B1 | * | 9/2002 | Takao et al. | 428/632 |
| 6,633,514 B1 | * | 10/2003 | Awano et al. | 369/13.28 |
| 2002/0068194 A1 | * | 6/2002 | Ito | 428/694 ML |

FOREIGN PATENT DOCUMENTS

| | | |
|---|---|---|
| EP | 0686970 | 12/1995 |
| EP | 0974962 | 1/2000 |
| EP | 0994472 | 4/2000 |
| JP | 3-93058 | 4/1991 |
| JP | 6-290496 | 10/1994 |
| JP | 7-147028 | 6/1995 |
| JP | 11-306607 | 11/1999 |
| JP | 11-339340 | 12/1999 |
| JP | 2000-10006 A * | 4/2000 |
| TW | 300303 | 3/1997 |

OTHER PUBLICATIONS

JPO Abstract Translation of JP 2000–100006–A (Doc. ID: JP 200010006 A).*

* cited by examiner

Primary Examiner—Kevin M Bernatz
(74) Attorney, Agent, or Firm—Fitzpatrick, Cella, Harper & Scinto

(57) ABSTRACT

A magneto-optical recording medium has a domain wall displacement layer, a recording layer for accumulating information and a switching layer arranged between said domain wall displacement layer and said recording layer and having a Curie temperature lower than those of the latter two layers. The domain wall displacement layer, the switching layer and the recording layer are coupled by exchange coupling at temperature not higher than the Curie temperature of the switching layer. The saturation magnetization of the domain wall displacement layer and the recording layer are in opposite directions to each other when the layers are coupled by exchange coupling at a temperature close to the Curie temperature of the switching layer.

5 Claims, 7 Drawing Sheets

Xa

DOMAIN WALL-DISPLACEMENT TYPE MAGNETO-OPTICAL MEDIUM AND REPRODUCING METHOD FOR THE SAME

BACKGROUND OF THE INVENTION

1. Field of the Invention

This invention relates to a magneto-optical medium adapted to reproduce information, utilizing displacement of domain walls by temperature gradient and also to a reproducing method for such a medium.

2. Related Background Art

Various magnetic recording mediums have been marketed as rewritable recording mediums. Particularly, magneto-optical recording mediums to be used for writing magnetic domains to record information there by means of thermal energy of a semiconductor laser and reading the stored information by means of magneto-optical effects are expected to develop into large capacity portable mediums capable of densely storing information in the future. In recent years, there has been an ever-increasing demand for raising the recording density and hence the storage capacity of such magnetic recording mediums in order to accommodate the current trend of digitizing moving images.

Generally, the linear recording density of an optical recording medium largely depends on the laser wavelength of the reproducing optical system and the numerical aperture NA of the objective lens. In other words, the diameter of the beam waist is defined by the laser wavelength $\lambda$ of the reproducing optical system and the numerical aperture NA of the objective lens. Then, the spatial frequency of recording pits that can be used for signal reproduction is $2NA/\lambda$ at most. Therefore, it is necessary to either use a short laser wavelength for the reproducing optical system or increase the numerical aperture of the objective lens for realizing a high recording density in a conventional optical disk. However, it is not easy to reduce the laser wavelength from the viewpoint of operating efficiency of devices and the problem of generation of heat. Additionally, as the numerical aperture of the objective lens is increased, more and more rigorous requirements are imposed on the mechanical precision of devices because of a shallow focal depth and other reasons.

In view of these problems, various so-called super-resolution technologies providing novel configurations for signal reproduction from recording mediums have been developed to improve the recording density without changing the laser wavelength and the numerical aperture.

For example, Japanese Patent Application Laid-Open No. 3-93058 proposes a signal reproduction method using a multilayer film having a memory layer where signals are recorded and a readout layer that are magnetically coupled with each other and transferring the recorded signals from the memory layer by firstly aligning the directions of magnetization of the readout layer and subsequently heating the readout layer by means of laser beam irradiation so that the signals may be transferred onto the heated region of the readout layer, while the transferred signals are simultaneously read out. This method can reduce inter-symbol interferences during the signal reproducing operation and reproduce signals with a spatial frequency greater than $2NA/\lambda$ because the region from which the recorded signals are retrieved by heating it with the laser beam until it gets to the signal transfer temperature can be confined to an area smaller than the spot diameter of the signal reproducing laser beam.

However, the above proposed signal reproduction method has a drawback that the region that is effectively used for signal detection and signal retrieval is smaller than the spot diameter of the signal reproducing laser beam and hence the reproduced signal shows only a small amplitude and a small output level. In other words, the region that is effectively used for signal detection cannot be reduced excessively relative to the spot diameter. Thus, the proposed method cannot remarkably raise the recording density relative to the recording density is theoretically limited by the diffraction of the optical system.

In an attempt for dissolving the above problem, Japanese Patent Application Laid-Open No. 6-290496 discloses a method that can retrieve signals recorded at a high density exceeding the resolving power of the optical system without reducing the amplitude of the reproduced signal by moving the domain walls located along the boundary section of each recorded mark (magnetic domain) to the high temperature side along the temperature gradient produced in the recording medium.

Now, this signal reproducing method will be described below in greater detail.

FIGS. 8A through 8C of the accompanying drawings schematically illustrate a magneto-optical recording medium and the information reproducing method to be used for such a magneto-optical recording medium as disclosed in the above cited patent document. FIG. 8A is a schematic cross sectional view of the magneto-optical recording medium showing its configuration and the magnetized condition of an area irradiated with a signal reproducing light beam and FIG. 8B is a graph illustrating the temperature distribution produced in the magneto-optical recording medium when irradiated with the light beam, whereas FIG. 8C is a graph illustrating the distribution of the domain wall energy density $\sigma$ of the domain wall displacement layer relative to the temperature distribution of FIG. 8B.

As shown in FIG. 8A, the magnetic layer of the magneto-optical recording medium has a multilayer structure formed by sequentially laying a magnetic layer 111 that is a domain wall displacement layer, another magnetic layer 112 that is a switching layer and still another magnetic layer 113 that is a memory layer, of which the magnetic layer 111 is arranged at the side to be irradiated with a signal reproducing light beam. In FIG. 8A, arrows 114 in the layers indicate the directions of atomic spin. Each domain wall 115 is formed along the boundary section of two regions where the respective directions 114 of atomic spin are inverted relative to each other.

In FIG. 8A, arrow 118 indicates the direction in which the recording medium is moved. The light beam spot 116 moves along the information track of the recording medium as the medium is displaced in the moving direction 118. As shown in FIG. 8B, the temperature T of the area irradiated with the light beam spot 116 rises from the front of the spot as viewed in the moving direction of the beam to produce a temperature distribution where the temperature gets to a peak at position Xc. Also note that the medium gets to temperature Ts that is close to the Curie temperature of the magnetic layer 112 at position Xa.

As shown in FIG. 8C, the distribution of the domain wall energy density $\sigma$ of the magnetic layer 111 reaches the lowest level at a position near the temperature peak located near the tail end of the light beam spot 116 and gradually increases toward the front end of the spot. When the domain wall energy density $\sigma$ shows a gradient along the variable position X, the domain wall of each of the layers at the position X is subjected to force F that is defined by equation (1) below.

$$F = \partial\sigma/\partial X \quad (1)$$

The force F is exerted so as to move the domain walls toward the lower domain wall energy area. Since the domain wall coercivity of the magnetic layer 111 is small and the domain wall is apt to be displaced to a large extent, the domain wall 115 will be easily moved by the force F when the magnetic layer is of a single layer structure. However, the temperature of the medium is lower than Ts and the magnetic layer 111 is coupled by exchange coupling to the magnetic layer 113 showing large domain wall coercivity in the region located in front of the position Xa relative to the spot so that the domain wall 115 is not displaced but rigidly held to a position corresponding to the domain wall in the magnetic layer 113 having large coercivity.

With this magneto-optical recording medium, as it is moved in the proper moving direction 118 and the domain wall 115 of the magnetic layer 111 gets to position Xa, the temperature of the medium at the domain wall 115 rises to Ts that is close to the Curie temperature of the magnetic layer 112 to break the exchange coupling between the magnetic layers 111 and 113. As a result, the domain wall 115 of the magnetic layer 111 is instantaneously displaced toward a region showing higher temperature and smaller domain wall energy density as indicated by broken-lined arrow 117. As the domain wall 115 passes below the light beam spot 116, the atomic spins of the magnetic layer 111 are forced to point a same direction.

Each time the domain wall comes to the position Xa as a result of the movement of the medium, it instantaneously passes below the light beam spot 16 to expand the recording domain to stretch from the position Xa to the position Xc and force the atomic spins of the magnetic layer 111 to point a same direction. Then, the retrieved signal constantly shows the largest possible amplitude without being restricted by the length between the domain walls where the signal is recorded (or the length of the recorded mark) and is completely freed from the problem of waveform interference caused by the optical limit of diffraction and other problems.

However, with the above described signal reproduction method according to Japanese Patent Application Laid-Open No. 6-290496, the force F necessary for causing the displacement of the domain wall is not particularly large at temperature close to Ts as shown in FIG. 8C. Thus, the starting point of displacement of the domain wall can fluctuate to give rise to large jitters to the retrieved signal so that the quality of the retrieved signal can be degraded.

SUMMARY OF THE INVENTION

In view of the above identified circumstances, it is therefore the object of the present invention to provide a magneto-optical recording medium adapted to reproduce information, utilizing displacement of a domain wall by temperature gradient, and also a reproducing method for such a medium that can eliminate fluctuations of the starting point of displacement of the domain wall and reproduce a signal with suppressed jitters.

In an aspect of the present invention, there is provided a magneto-optical recording medium comprising:

a domain wall displacement layer for displacing domain walls;

a recording layer for storing information; and a switching layer arranged between the domain wall displacement layer and the recording layer and having a Curie temperature lower than those of the latter two layers, wherein the domain wall displacement layer, the switching layer and the recording layer are coupled by exchange coupling at temperature not higher than the Curie temperature of the switching layer, and the saturation magnetization of the domain wall displacement layer and that of the recording layer are reciprocally parallel to each other in a state of being coupled by exchange coupling at temperature close to the Curie temperature of the switching layer.

In another aspect of the invention, there is provided a reproducing method to be used with the above magneto-optical recording medium, comprising:

a step of forming a predetermined temperature distribution having a temperature zone exceeding the Curie temperature of the switching layer on the magneto-optical recording medium by means of a laser beam;

a step of breaking the exchange coupling between the domain wall displacement layer and the recording layer in a region having the temperature zone exceeding the Curie temperature of the switching layer and displacing a domain wall formed in the domain wall displacement layer toward the high temperature side along the temperature gradient of the temperature distribution; and a step of detecting information stored in the recording layer, utilizing the laser beam reflected from the medium.

DESCRIPTION OF THE PREFERRED EMBODIMENTS

Figure 1A:
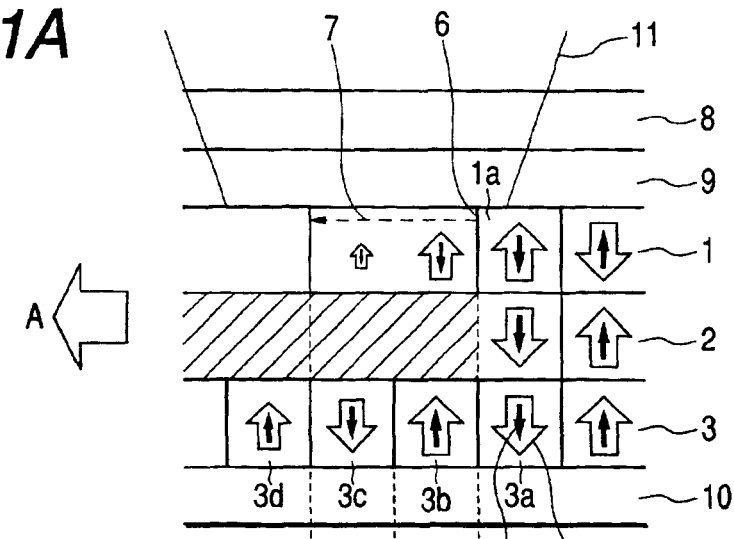
FIG. 1A is a schematic partial cross sectional view a magneto-optical recording medium according to the invention, illustrating the configuration thereof and a change in the magnetized state thereof that takes place when irradiated with a signal reproducing light beam.
Figure 1B:
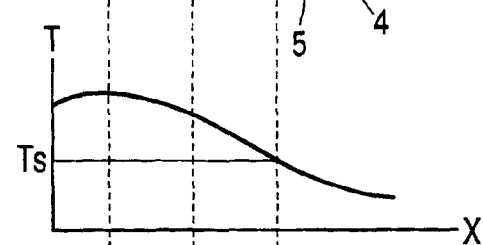
FIG. 1B is a graph illustrating the temperature distribution produced on the magneto-optical recording medium of FIG. 1A when irradiated with a signal reproducing light beam.
Figure 1C:
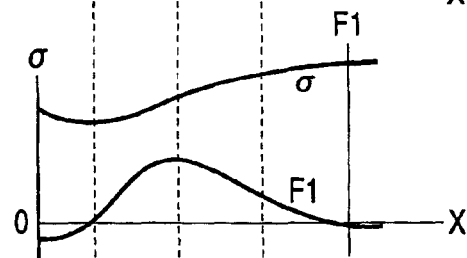
FIG. 1C is a graph illustrating the distribution of the domain wall energy density σ of the domain wall displacement layer and the force F1 acting on the domain wall corresponding to the temperature distribution of FIG. 1B.
Figure 1D:
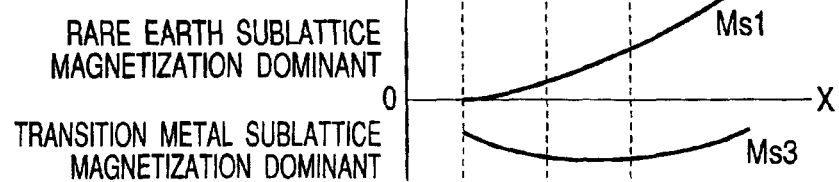
FIG. 1D is a graph illustrating the distribution of the saturation magnetization of the domain wall displacement layer and the recording layer corresponding to the temperature distribution of FIG. 1B.
Figure 1E:
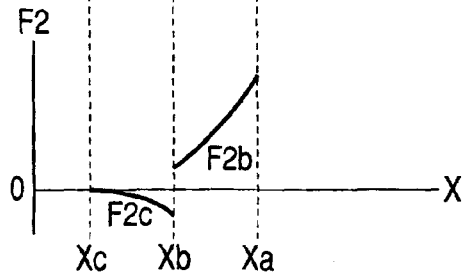
FIG. 1E is a graph illustrating the distribution of the magnetostatic force in FIG. 1A.

FIGS. 1A through 1E are schematic illustrations of an embodiment of magneto-optical medium according to the invention and the principle underlying the information reproducing operation thereof, of which FIG. 1A is a schematic partial cross sectional view a magneto-optical recording medium according to the invention, illustrating the configuration thereof and a change in the magnetized state thereof that takes place when irradiated with a signal reproducing light beam and FIG. 1B is a graph illustrating the temperature distribution produced on the magneto-optical recording medium of FIG. 1A when irradiated with a signal reproducing light beam, whereas FIG. 1C and FIG. 1D are graphs respectively illustrating the distribution of the domain wall energy density σ of the domain wall displacement layer and the force F1 acting on the domain wall corresponding to the temperature distribution of FIG. 1B and the saturation magnetization of the domain wall displacement layer and that of the recording layer corresponding to the temperature distribution of FIG. 1B and FIG. 1E is a graph illustrating the distribution of the magnetostatic force in FIG. 1A.

FIG. 1A illustrates the basic configuration of this embodiment of magneto-optical recording medium. Referring to FIG. 1A, the embodiment comprises an enhancing layer 9, a magnetic layer 1 that is a domain wall displacement layer, another magnetic layer 2 that is a switching layer, still another magnetic layer 3 that is a recording layer and a protective layer 10 laid sequentially on a substrate 8. The magnetic layer 1 is located close to the surface to be irradiated with a signal reproducing light beam. The signal reproducing light beam that is a laser beam 11 is irradiated from the side of the substrate 8 to produce a signal reproducing spot on the surface of the magnetic layer 1. As the medium is moved in the direction of arrow A in FIG. 1, the signal reproducing spot moves on an information track.

Recorded domains 3a, 3b, 3c, 3d and so on are sequentially formed on the magnetic layer 3 and the recorded domains in the region where the temperature of the medium is not higher than the Curie temperature of the magnetic layer 2 are transferred onto the magnetic layer 1 without modification as the magnetic layers 1 and 3 are coupled by exchange coupling. In FIG. 1A, recorded domain 1a is produced as a result of transfer of the recorded domain 3a of the magnetic layer 3. In FIG. 1A, each white arrow 4 indicates saturation magnetization of a magnetic domain whereas each black arrow 5 indicates the direction of transition metal sublattice magnetization in the corresponding magnetic domain.

The area irradiated with the laser beam 11 gives rise to a temperature distribution pattern having a certain temperature gradation relative to the moving direction of the laser beam 11 as shown in FIG. 1B. In the instance of FIG. 1B, the temperature of the recording medium has reached the Curie temperature Ts of the magnetic layer 2 at position Xa located slightly behind (left in FIG. 1A) the front end of the signal reproducing spot (as viewed in the moving direction of the signal reproducing spot) of the laser beam 11 and exceeds the Curie temperature Ts in a region located behind the position Xa to break the exchange coupling of the magnetic layers 1 and 3.

FIG. 1C illustrates the distribution of the domain wall energy density σ of the magnetic layer 1 and the force F1 acting on the domain wall corresponding to the temperature distribution of FIG. 1B. As seen from FIG. 1C, the distribution shows a gradient along the direction of variable position X (or the moving direction of the signal reproducing spot) and locates a minimal point close to the peak of the temperature distribution shown in FIG. 1B. When the domain wall energy density σ shows a gradient along the variable position X, the domain wall of each of the layers at the position X is subjected to force F1 that is defined by equation (2) below.

$$F1 = \partial \sigma / \partial X \quad (2)$$

The force F1 is exerted so as to move the domain walls toward the lower domain wall energy area. Since the domain wall coercivity of the magnetic layer 1 is small as compared with those of the switching layer 2 and the recording layer 3 and hence the domain wall is apt to be displaced to a large extent, the domain wall 6 will be moved by the force F1. However, the temperature of the medium is lower than the Curie temperature Ts of the magnetic layer 2 in the region located in front of (right relative to) the position Xa so that the domain wall is rigidly held to a position corresponding to the domain wall in the magnetic layer 3 as a result of the exchange coupling with the magnetic layer 3 having large coercivity.

With this magneto-optical recording medium, as it is moved in the direction of arrow A and the domain wall 6 of the magnetic layer 1 gets to position Xa, the temperature of the medium rises to the Curie temperature Ts of the magnetic layer 2 at the position of the domain wall 6 to break the exchange coupling of the magnetic layers 1 and 3. As a result, the domain wall 6 of the magnetic layer 1 is instantaneously displaced toward a region showing higher temperature and smaller domain wall energy density as indicated by broken-lined arrow 7. Thus, as a result of the movement of the medium, the domain wall instantaneously passes under the signal reproducing spot each time the domain wall 6 gets the position Xa.

The principle of movement of the domain wall due to the force F1 is the same as that of a domain wall of a magneto-optical recording medium disclosed in the above cited Japanese Patent Application Laid-Open No. 6-290496. However, in the case of this embodiment of magneto-optical recording medium, the domain wall is also subjected to magnetostatic force F2 that is generated by saturation magnetization of the magnetic layers 1 and 3 in addition to the above force F1.

In this embodiment, the saturation magnetization as shown in FIG. 1D appears corresponding to the temperature distribution of FIG. 1B. In FIG. 1D, saturation magnetization Ms1 is the one produced in the magnetic layer 1, whereas saturation magnetization Ms3 is the one produced in the magnetic layer 3. Rare earth sublattice magnetization is dominant in the magnetic layer 1 at and near the Curie temperature Ts of the magnetic layer 2, while transition metal sublattice magnetization is dominant in the magnetic layer 3 at and near the Curie temperature Ts of the magnetic layer 2.

Thus, the recorded domains of the magnetic layer 1 are subjected to magnetostatic force F2 (F2b and F2c shown in FIG. 1E) that is proportional to the saturation magnetizations Ms1 and Ms3 due to the leakage magnetic field produced from the recorded domains of the magnetic layer 3. When the saturation magnetization of the magnetic domain to be expanded of the magnetic layer 1 and the saturation magnetization of the corresponding recorded domain of the magnetic layer 3 located at the position where the magnetic domain to be expanded passes by are directed in the same direction, the magnetostatic force F2 is so directed as to reliably expand the magnetic domain. With this embodiment of magneto-optical recording medium, the magnetostatic force F2 directed to expand the magnetic domain is utilized to provide an auxiliary effect for moving the domain wall.

Now, the operation of reproducing information from this embodiment of magneto-optical recording medium will be described below.

As shown in FIG. 1D and described above, with this embodiment of magneto-optical recording medium, rare earth sublattice magnetization is dominant in the magnetic layer 1 at and near the Curie temperature Ts of the magnetic layer 2, while transition metal sublattice magnetization is dominant in the magnetic layer 3 at and near the Curie temperature Ts of the magnetic layer 2. Therefore, the saturation magnetization Ms1 of the recorded domain 1a of the magnetic layer 1 and the saturation magnetization Ms3 of the recorded domain 3a of the magnetic layer 3 become anti-parallel (i.e., directed oppositely) to each other between the magnetic layers 1 and 3 that are coupled by exchange coupling at and near the position Xa where the temperature of the medium gets to the Curie temperature Ts of the magnetic layer 2.

Firstly, assume that the domain wall 6 passes through the region between position Xa (where the temperature of the medium gets to the Curie temperature Ts of the magnetic layer 2) and position Xb (where the domain wall between the recorded domains 3b and 3c of the magnetic layer 3 is located). In this region, magnetostatic force F2b acting to expand the magnetic domain as shown in FIG. 1E is generated because the saturation magnetization Ms1 of the recorded domain 1a of the magnetic layer 1 and the saturation magnetization Ms3 of the recorded domain 3b of the magnetic layer 3 are directed to the same direction. Thus, the magnetostatic force F2b and the force F1 defined by the above equation (2) drive the domain wall 6 to move. Due to the magnetostatic force F2b generated to expand the magnetic domain, the force driving the domain wall 6 immediately after getting to the temperature Ts for starting a domain wall displacement is significantly increased to consequently stabilize the starting point of displacement of the domain wall.

Now, assume that the domain wall 6 passes through the region between position Xb and Xc (where the domain wall between the recorded domains 3c and 3d of the magnetic layer 3 is located). In this region, magnetostatic force F2c acting not to expand the magnetic domain as shown in FIG. 1E is generated because the saturation magnetization Ms1 of the recorded domain 1a of the magnetic layer 1 and the saturation magnetization Ms3 of the recorded domain 3c of the magnetic layer 3 are directed to opposite directions. However, since the temperature of the medium in this region is sufficiently high, the magnetostatic force F2c is small. Additionally, since the force F1 defined by the above equation (2) is sufficiently large, it alone is sufficient for driving the domain wall 6 to move.

Figure 2A:
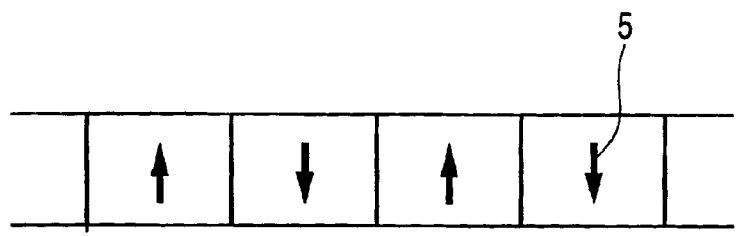
FIG. 2A is a schematic illustration of typical recorded domains that are formed in the recording layer.
Figure 2B:
FIG. 2B is a graph schematically illustrating the waveform of a signal reproduced from magnetic domains on the basis of the information reproducing principle shown in FIGS. 1A through 1E.
Figure 2C:
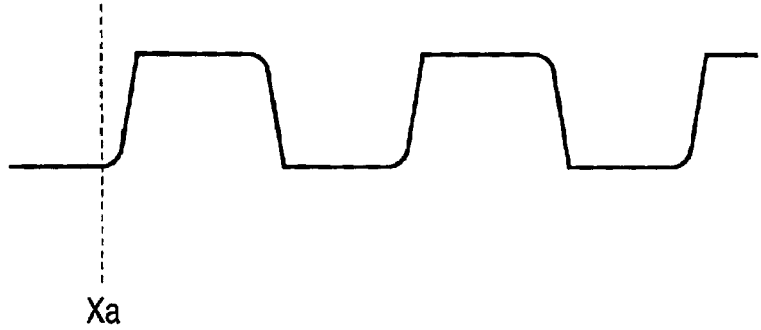
FIG. 2C is a graph schematically illustrating the waveform of a signal reproduced from magnetic domains by a known reproducing method.

It will be appreciated from the above description that a sufficient force for driving the domain wall is obtained from the very start of movement of the domain wall with this embodiment of magneto-optical recording medium. FIG. 2A is a schematic illustration of typical recorded domains that are formed in the recording layer and FIG. 2B is a graph schematically illustrating the waveform of a signal reproduced from the recorded domains of FIG. 2A by the above described reproducing method, while FIG. 2C is a graph schematically illustrating the waveform of a signal reproduced from the recorded domains by a known reproducing method. In FIG. 2A, each black arrow 5 indicates the direction of transition metal sublattice magnetization in the corresponding magnetic domain. The direction of sublattice magnetization of each recorded domain is inverted from that of the recorded domain of either side. It will be appreciated by comparing FIG. 2B and FIG. 2C that a domain wall reliably starts to move immediately after it gets to position Xa and reproduces a signal showing a well-shaped rectangular waveform in this embodiment of magneto-optical recording medium to suppress jitter.

While transition metal sublattics magnetization is dominant in the magnetic layer 3 at and near the Curie temperature Ts of the magnetic layer 2 in the above embodiment of magneto-optical recording medium, it may alternatively be so arranged that rare earth metal sublattice magnetization is dominant in the magnetic layer 3.

The above described embodiment of magneto-optical recording medium may additionally comprise a metal layer of Al, AlTa, AlTi, AlCr or Cu in order to make it possible to thermally regulate the embodiment. The embodiment may still additionally comprise a protection coat layer made of polymeric resin. The above medium may be constituted by bonding substrates carrying the respective layers thereon.

In the above described embodiment of magneto-optical recording medium, the magnetic layers 1 through 3 may be made of any of various magnetic materials. For example, they may be made of a rare earth-iron group element amorphous alloy containing one or more than one rare earth metal elements typically selected from Pr, Nd, Sm, Gd, Tb, Dy and Ho by 10 to 40 at % and one or more than one iron group elements typically selected from Fe, Co and Ni by 90 to 60 at %. An element selected from Cr, Mn, Cu, Ti, Al, Si, Pt and In may be added to a small ratio in order to improve the anticorrosion effect of the magnetic layers.

If a rare earth-iron group element amorphous alloy is used, the saturation magnetization can be controlled by controlling the composition ratio of the rare earth element(s) to the iron group element(s). While the Curie temperature can also be controlled by controlling the composition ratio, a method of using iron group elements obtained by partly substituting Co for Fe as material and controlling the extent of substitution may preferably be employed to control the saturation magnetization independently. More specifically, since the Curie temperature is expected to rise by about 6° C. by substituting Co for Fe by 1 at %, it is possible to regulate the rate of addition of Co so as to obtain a desired Curie temperature by using this relationship. It is also possible to lower the Curie temperature by adding one or more than one nonmagnetic elements such as Cr and Ti to a slight extent. The Curie temperature can also be controlled by using two or more than two rare earth elements and regulating the composition ratio thereof.

Alternatively, a material such as garnet, a platinum group-iron group element periodic structure film or a platinum group-iron group alloy may be used.

Preferably, a rare earth-iron group element amorphous alloy whose perpendicular magnetic anisotropy is low such as GdCo, GdFeCo, GdFe or NdGdFeCo or a material to be used for bubble memories such as garnet is used for the magnetic layer 1. On the other hand, the magnetic layer 3 is preferably made of a rare earth-iron group element amorphous alloy whose perpendicular magnetic anisotropy is high such as TbFeCo, DyFeCo, TbDyFeCo or a platinum group-iron group element periodic structure film whose perpendicular magnetic anisotropy is also high such as Pt/Co or Pd/Co because such alloys can stably maintain a magnetized state.

The exchange coupling of at least the magnetic layer 1 is broken between adjacent information tracks in the intra-film direction thereof. As a result, the domain wall can be displaced smoothly along the information tracks. Such a condition can be realized by annealing the magnetic layer between the information tracks, using a high output power laser beam.

Now, the operation of recording a data signal onto the embodiment of magneto-optical recording medium will be briefly discussed below.

A data signal is recorded by modulating the external magnetic field as a function of the data signal to be recorded, while moving the medium and irradiating a laser beam along the track with a power level sufficient for raising the temperature of the magnetic layer 3 to above the Curie temperature thereof, or by applying a magnetic field in a predetermined direction and modulating the power of the laser beam irradiating the track as a function of the data signal to be recorded. With the latter recording technique, it is possible to form a recorded domain smaller than the light spot diameter by regulating the intensity of the laser beam in such a way that only a predetermined region of the light spot is raised to a temperature level close to the Curie temperature of the magnetic layer 3.

Figure 3:
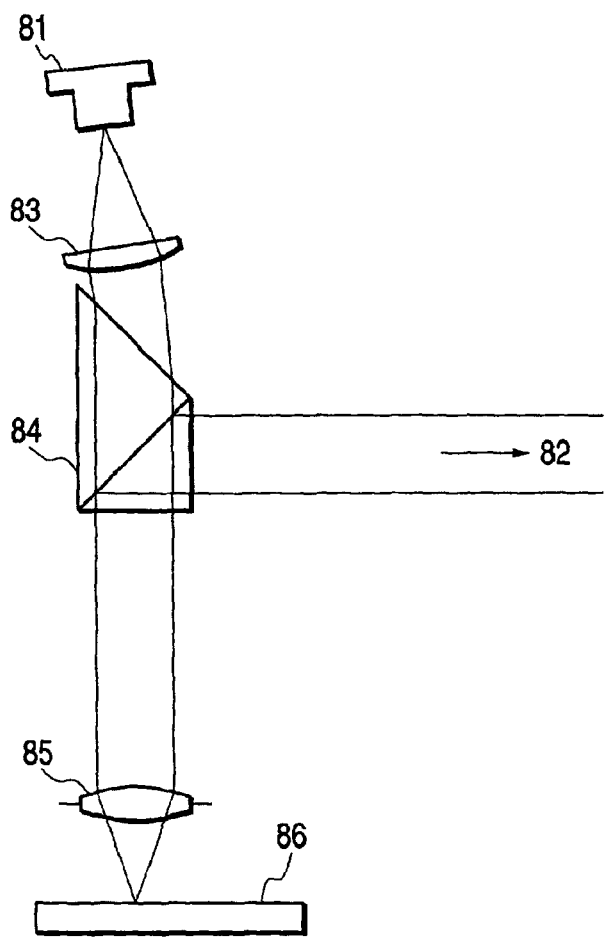
FIG. 3 is a schematic illustration of the optical system of a recording/reproducing apparatus capable of recording data in and reproducing data from a magneto-optical recording medium as illustrated in FIGS. 1A through 1E.

FIG. 3 is a schematic illustration of the optical system of a recording/reproducing apparatus capable of recording data in and reproducing data from a magneto-optical recording medium as illustrated in FIGS. 1A through 1E. In FIG. 3, the laser beam source 81 is adapted to be used for recording/reproducing and emit a laser beam with a wavelength of 680 nm.

Referring to FIG. 3, a collimator lens 83, a beam-shaping beam splitter 84 and an objective lens 85 are sequentially arranged in the sense of the moving direction of the laser beam emitted from the laser beam source 81. The beam-shaping beam splitter 84 is so designed that it transmits the P-polarized component of the laser beam (680 nm) emitted from the laser beam source 81 by 70 to 80% and reflects the S-polarized component of the laser beam by 100%. The objective lens 85 is to be arranged vis-a-vis a magneto-optical recording medium 86 according to the invention having a configuration as shown in FIG. 1A. The laser beam emitted from the laser beam source 81 is focused on the recording surface of the medium 86 by the objective lens 85.

More specifically, with this recording/reproducing apparatus, the laser beam (680 nm) from the laser beam source 81 is focused on a groove (or a land) of the recording surface of the magneto-optical recording medium 86 to produce a signal recording/reproducing beam spot. Data are reproduced by using the signal recording/reproducing beam spot, typically moving the magneto-optical recording medium 86 at a linear velocity of 1.5 m/sec. With this arrangement, the recording medium can be heated to make it show a temperature gradient as illustrated in FIG. 1B for signal reproduction.

Now, a magneto-optical recording medium according to the invention will be described further by way of Examples by referring to the accompanying drawings.

EXAMPLE 1

Figure 4:
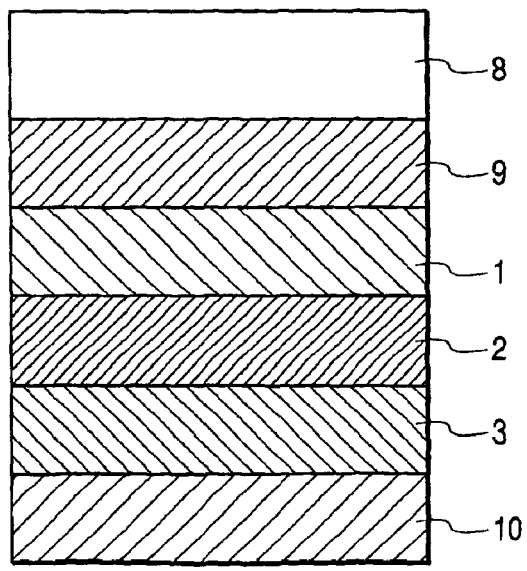
FIG. 4 is schematic cross sectional view of the magneto-optical recording medium of Example 1, illustrating the multilayer structure thereof.

FIG. 4 is schematic cross sectional view of the magneto-optical recording medium of Example 1, illustrating the basic multilayer structure thereof. Like the magneto-optical recording medium described above by referring to FIG. 1A, this magneto-optical recording medium comprises a bottom layer 9, a magnetic layer 1 that is a domain wall displacement layer, another magnetic layer 2 that is a switching layer, still another magnetic layer 3 that is a recording layer and a surface layer 10 laid sequentially on a substrate 8.

The substrate 8 is typically made of polycarbonate or glass. In this example, a land/groove recording type glass 2P substrate having a track pitch of 0.6 $\mu$m and a groove depth of about 180 nm was used for the substrate 8. The bottom layer 9 is typically made of a transparent dielectric material such as $Si_3N_4$, AlN, $SiO_2$, SiO, ZnS or $MgF_2$. A similar dielectric material may be used for the surface layer 10 that is formed as protection layer. These layers can be formed by continuous sputtering using a magnetron sputtering system, continuous evaporation or some other appropriate technique.

The magnetic layers 1 through 3 can be coupled by exchange coupling as they are continuously formed without breaking the vacuum of the film forming system. While a rare earth-iron group element amorphous alloy is used for the magnetic layer 2 that is a switching layer as in the case of the other magnetic layers 1 and 3, it is in fact a perpendicularly magnetized film of $Tb_{0.19}Fe_{0.81}$, whose Curie temperature Ts is about 150° C. and lower than the other two magnetic layers 1 and 3. This magnetic layer 2 can be coupled with each of the other two magnetic layers 1 and 3 at temperature lower than the Curie temperature Ts. $Gd_{0.25}Fe_{0.60}Co_{0.10}Al_{0.05}$ whose domain wall mobility is larger than the other magnetic layers 2 and 3 and whose perpendicular magnetic anisotropy is smaller than the other layers 2 and 3 is used for the magnetic layer 1 that is a domain wall displacement layer. The magnetic layer 1 has a Curie temperature of about 270° C. and rare earth sublattice magnetization is dominant in the magnetic layer 1 at and near the Curie temperature Ts (about 150° C.) of the magnetic layer 2.

Very small recording pits can be formed in the magnetic layer 3 that is a recording layer and securely maintained.

$Tb_{0.22}Fe_{0.58}Co_{0.20}$ having large coercivity is used for the magnetic layer 3. The Curie temperature of the magnetic layer 3 is about 300° C. and transition metal sublattice magnetization is dominant in the magnetic layer 3 at and near the Curie temperature Ts (about 150° C.) of the magnetic layer 2. As for the film thicknesses of the magnetic layers 1 through 3, the magnetic layer 1 (domain wall displacement layer) is about 30 nm thick and the magnetic layer 2 (switching layer) is about 10 nm thick, while the magnetic layer (recording layer) is about 80 nm thick.

The magneto-optical medium having the above described configuration was evaluated for signal reproduction at the grooves. Data were recorded in the magnetic layer 3 by using a recording optical system with a laser beam having a wavelength λ of 680 nm and an objective lens having a numerical aperture NA of 0.55 at a linear velocity of 1.5 m/s and modulating the external magnetic field of 3000 e (oersted (CGS electromagnetic unit system)) by means of 5 MHz while irradiating a laser beam having a laser power output level of 3 mW. The recorded data were reproduced by using a laser beam having a laser power output level of 1.5 mW to obtain a signal showing a well-shaped rectangular waveform as illustrated in FIG. 2B that rises immediately behind the position Xa.

COMPARATIVE EXAMPLE 1

Figure 5A:
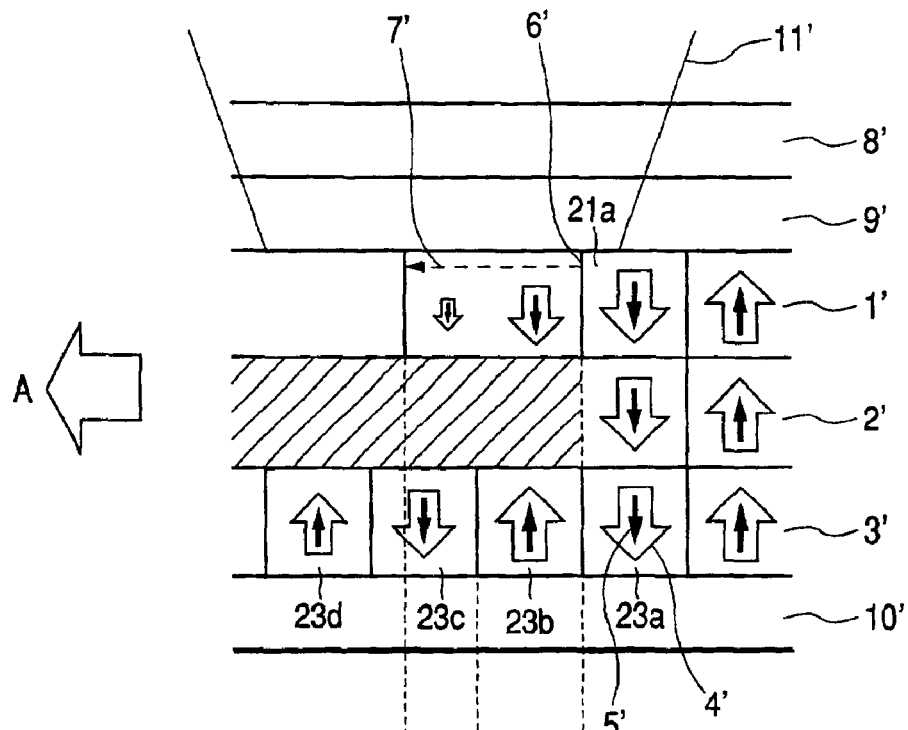
FIG. 5A is a schematic cross sectional view of the magneto-optical recording medium of Comparative Example 1, illustrating its configuration and the change in the magnetized state thereof when irradiated with a signal reproducing light beam.
Figure 5B:
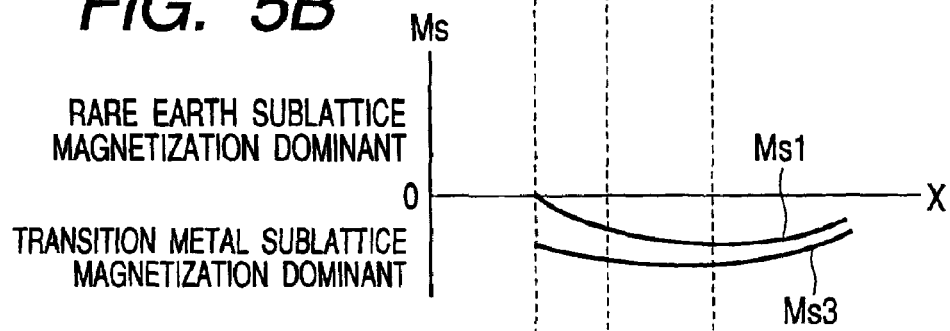
FIG. 5B is a graph illustrating the distribution of the saturation magnetization of the domain wall displacement layer and that of the saturation magnetization of the recording layer corresponding to the temperature distribution produced in the recording medium when irradiated with signal reproducing light beam as in FIG. 5A.
Figure 5C:
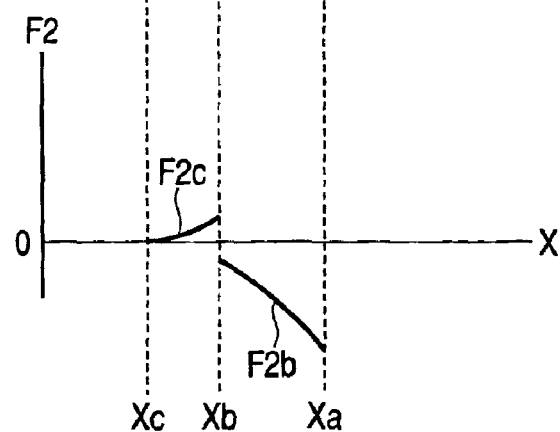
FIG. 5C is a graph illustrating the distribution of the magnetostatic force in FIG. 5A.

FIGS. 5A through 5C schematically illustrate the principle of reproducing signals from the magneto-optical recording medium of Comparative Example 1 that is comparable to Example 1. FIG. 5A is a schematic cross sectional view of the magneto-optical recording medium of Comparative Example 1, illustrating its configuration and the change in the magnetized state thereof when irradiated with a signal reproducing light beam and FIG. 5B is a graph illustrating the distribution of the saturation magnetization of the domain wall displacement layer and that of the saturation magnetization of the recording layer corresponding to the temperature distribution produced in the recording medium when irradiated with signal reproducing light beam, whereas FIG. 5C is a graph illustrating the distribution of the magnetostatic force generated by the distribution of saturation magnetization of FIG. 5B. While the elements denoted by reference symbols 1' through 11' in FIG. 5A are substantially the same as the elements 1 through 11 in FIG. 1A, the magnetic layer 1' that is a domain wall displacement layer has a composition different from the magnetic layer 1 of FIG. 1A.

In the magneto-optical recording medium of this comparative example, $Gd_{0.22}Fe_{0.62}Co_{0.10}Al_{0.06}$ whose domain wall mobility is larger than the other magnetic layers 2' and 3' and whose perpendicular magnetic anisotropy is smaller than the other layers 2' and 3' is used for the magnetic layer 1'. The magnetic layer 1' has a Curie temperature of about 270° C. and transition metal sublattice magnetization is dominant in the magnetic layer 1' at and near the Curie temperature Ts (about 150° C.) of the magnetic layer 2'. Therefore, the saturation magnetization Ms1 of the recorded domain 21a of the magnetic layer 1' and the saturation magnetization Ms3 of the recorded domain 23a of the magnetic layer 3' become parallel (and directed in the same direction) to each other between the magnetic layers 1' and 3' that are coupled by exchange coupling at and near the position Xa where the temperature of the medium gets to the Curie temperature Ts of the magnetic layer 2'.

Now, assume that the domain wall 6' passes through the region between position Xa and position Xb (where the domain wall between the recorded domains 23b and 23c of the magnetic layer 3' is located). In this region, magnetostatic force F2b acting not to expand the magnetic domain as shown in FIG. 5C is generated because the saturation magnetization Ms1 of the recorded domain 21a of the magnetic layer 1' and the saturation magnetization Ms3 of the recorded domain 23b of the magnetic layer 3' are made anti-parallel (i.e. directed oppositely) to each other. It is difficult for the domain wall 6' to be displaced immediately after getting to the temperature Ts because the force F1 is small for starting a domain wall displacement and additionally the magnetostatic force F2b acts not to expand the magnetic domain. Thus, the starting point of displacement of the domain wall becomes unstable.

The magneto-optical recording medium of this comparative example was evaluated for signal reproduction as in the case of Example 1. However, it was found that the reproduced signal did not rise immediately behind the position Xa and showed a rounded signal waveform as illustrated in FIG. 2C. It was confirmed that the domain wall displacement of this comparative example was delayed at a position immediately behind the position Xa as compared with Example 1.

EXAMPLE 2

Figure 6A:
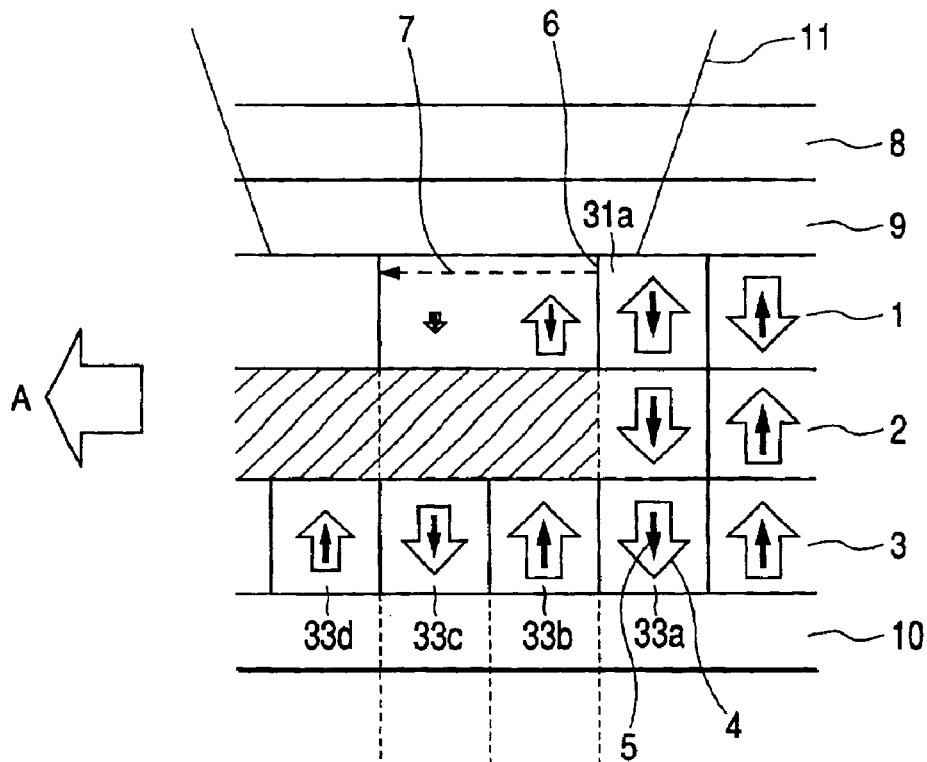
FIG. 6A is a schematic cross sectional view of the magneto-optical recording medium of Example 2, illustrating its configuration and the change in the magnetized state thereof when irradiated with a signal reproducing light beam.
Figure 6B:
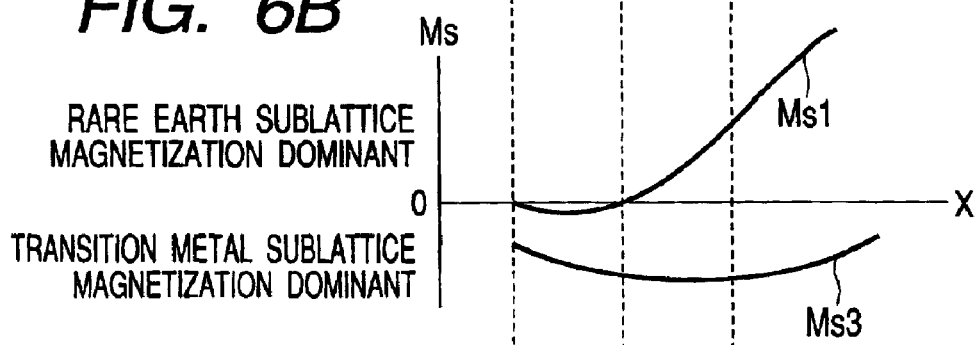
FIG. 6B is a graph illustrating the distribution of the saturation magnetization of the domain wall displacement layer and that of the saturation magnetization of the recording layer corresponding to the temperature distribution produced in the recording medium when irradiated with signal reproducing light beam as in FIG. 6A.
Figure 6C:
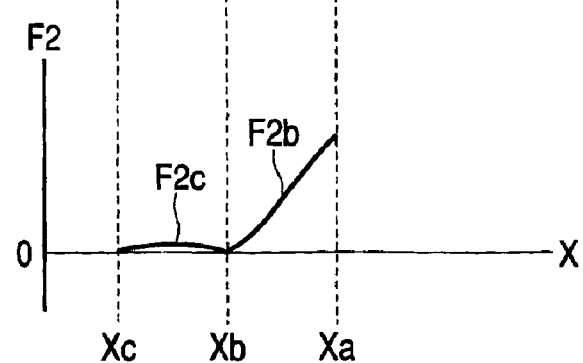
FIG. 6C is a graph illustrating the distribution of the magnetostatic force generated by the distribution of saturation magnetization of FIG. 6B.

FIGS. 6A through 6C schematically illustrate the principle of reproducing signals from the magneto-optical recording medium of Example 2. FIG. 6A is a schematic cross sectional view of the magneto-optical recording medium of Example 2, illustrating its configuration and the change in the magnetized state thereof when irradiated with a reproducing light beam and FIG. 6B is a graph illustrating the distribution of the saturation magnetization of the domain wall displacement layer and that of the saturation magnetization of the recording layer corresponding to the temperature distribution produced in the recording medium when irradiated with a reproducing light beam, whereas FIG. 6C is a graph illustrating the distribution of the magnetostatic force generated by the distribution of saturation magnetization of FIG. 6B. In FIG. 6A, the elements that are the same as or similar to those of FIG. 1A are denoted respectively by the same reference symbols.

The magneto-optical recording medium of this example is identical with that of Example 1 except that the composition of the domain wall displacement layer was different from that of the specimen of Example 1. More specifically, $Gd_{0.23}Fe_{0.61}Co_{0.10}Al_{0.06}$ whose domain wall mobility is larger than the other magnetic layers 2 and 3 and whose perpendicular magnetic anisotropy is smaller than the other layers 2 and 3 is used for the magnetic layer 1, which is the domain wall displacement layer. The magnetic layer 1 has a Curie temperature of about 260° C. and rare earth sublattice magnetization is dominant in the magnetic layer 1 at about 150° C. (the Curie temperature Ts of the magnetic layer 2 that is the switching layer). Additionally, the compensation temperature of the magnetic layer 1 is found between 150° C. and the Curie temperature, or 260° C. of the magnetic layer 1.

In the magneto-optical recording medium of this example, the saturation magnetization Ms1 of the recorded domain 31a of the magnetic layer 1 and the saturation magnetization Ms3 of the recorded domain 33a of the magnetic layer 3 become anti-parallel (i.e. directed oppositely) to each other between the magnetic layers 1 and 3 that are coupled by exchange coupling at and near the position Xa where the temperature of the medium gets to the Curie temperature Ts of the magnetic layer 2.

Firstly, assume that the domain wall 6 passes through the region between position Xa and position Xb (where the domain wall between the recorded domains 33b and 33c is located). In this region, magnetostatic force F2b acting to expand the magnetic domain as shown in FIG. 6C is generated because the saturation magnetization Ms1 of the recorded domain 31a of the magnetic layer 1 and the saturation magnetization Ms3 of the recorded domain 33b of the magnetic layer 3 are parallel to each other (and directed to a same direction). Thus, the magnetostatic force F2b and the force F1 defined by the above equation (2) drive the domain wall 6 to move. Due to the magnetostatic force F2b generated to expand the magnetic domain, the force driving the domain wall 6 immediately after getting to the temperature Ts for starting a domain wall displacement is increased to consequently stabilize the starting point of displacement of the domain wall.

Now, assume that the domain wall 6 passes through the region between position Xb and Xc (where the domain wall 6 is located after the domain wall displacement and also the domain wall between the recorded domains 33c, 33d of the magnetic layer 3 is located). In this region, unlike the specimen of Example 1, however, since the recorded domain 31a of the magnetic layer 1 gets to the compensation temperature, the saturation magnetization Ms1 of the magnetic layer 1 is reduced to nil (see FIG. 6B) and hence the magnetostatic force F2c acting to block the domain wall displacement becomes very small (see FIG. 6C). Because the force F1 defined by the formula (2) is sufficiently large, it alone is sufficient for driving the domain wall 6.

Figure 7:
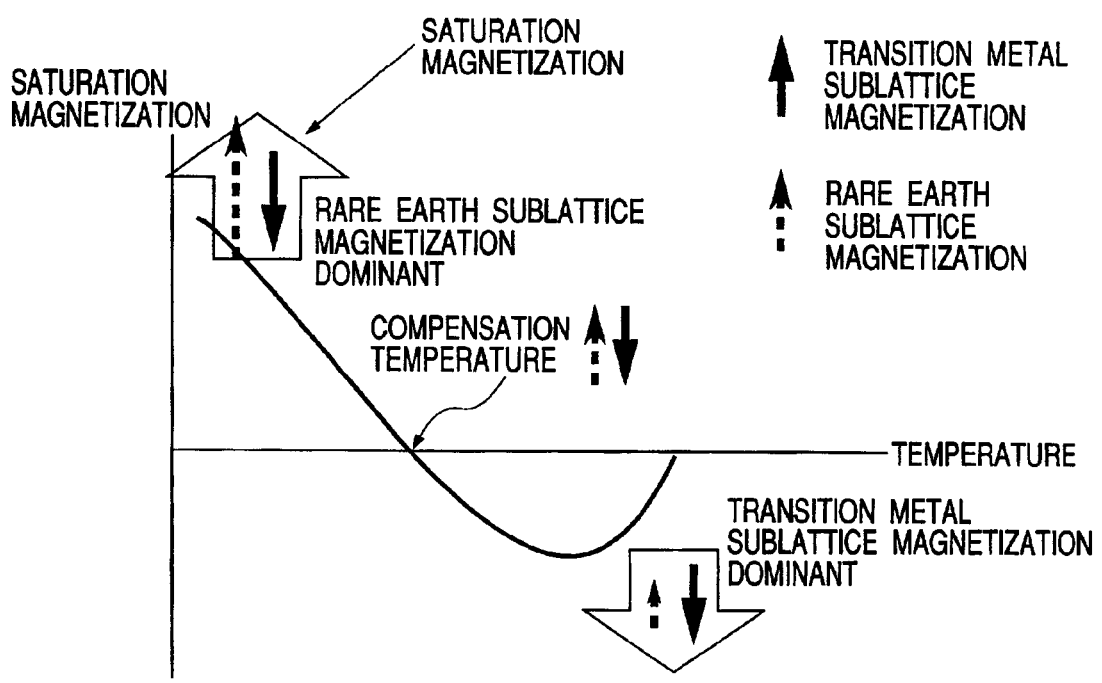
FIG. 7 is a graph illustrating the compensation temperature of a ferrimagnetic material.
Figure 8A:
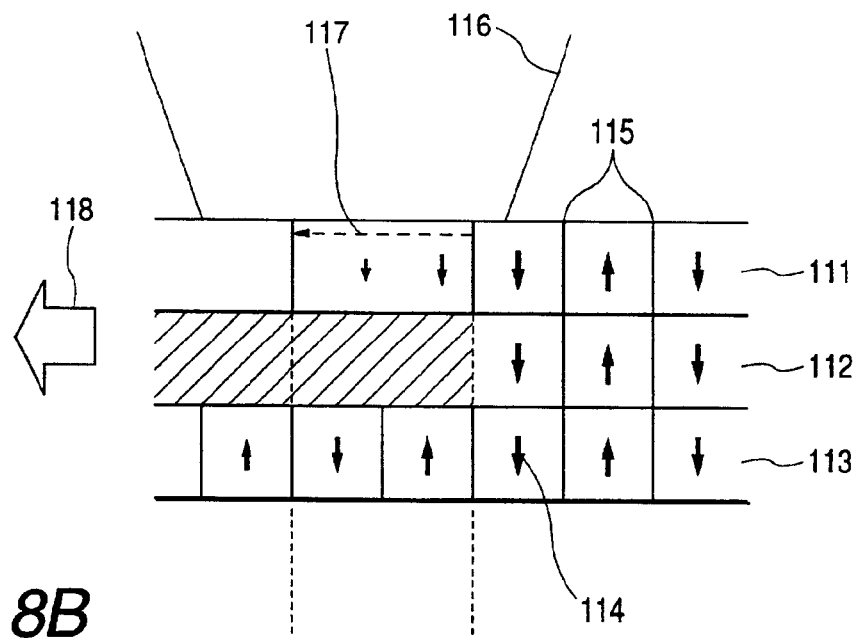
FIGS. 8A, 8B and 8C schematically illustrate a known magneto-optical recording medium and the principle of reproducing information from such a recording medium.
Figure 8B:
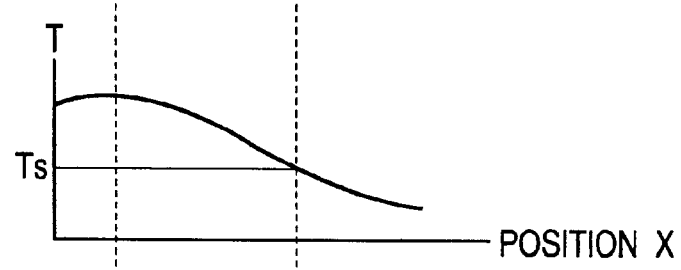
Figure 8C:
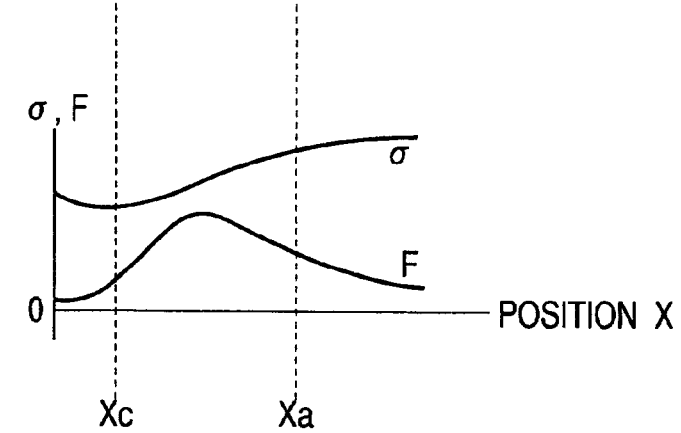

Now, the compensation temperature will be described briefly. FIG. 7 is a graph illustrating the compensation temperature of a ferrimagnetic material. The vertical axis of the graph represents the saturation magnetization and the horizontal axis represents the temperature. In FIG. 7, the white arrows indicate saturation magnetization while black arrows indicate transition metal sublattice magnetization and arrows drawn by broken lines indicate rare earth sublattice magnetization. As shown in FIG. 7, the saturation magnetization of the ferrimagnetic material decreases with the temperature rise and its direction is inverted at a given temperature level. The temperature at which the saturation magnetization becomes inverted is referred to as compensation temperature. The saturation magnetization Ms becomes nil at the compensation temperature. However, it should be noted that the sublattice maintains the magnetic moment when the saturation magnetization is reduced to nil as shown in FIG. 7. The compensation temperature can be regulated by regulating the composition ratio of the magnetic layer 1.

In order to obtain a sufficiently strong signal, the magnetic moment of the transition metal sublattice needs to remain over a wide range between the position Xa and the position Xc. In the case of the specimen of Example 1, the force F2 acting to block the effect for expanding the magnetic domain remains to a slight extent because the saturation magnetization Ms is found at temperature where magnetic moment of the transition metal sublattice exists and hence the influence of the leakage magnetic field remains. To the contrary, with the specimen of this example that is made to show compensation temperature between the position Xa and the position Xc, the influence of the leakage magnetic field can be made very small if the magnetic moment of the transition metal sublattice is allowed to exist in this region.

The magneto-optical recording medium of this example was evaluated for signal reproduction as in the case of Example 1 to find that it could reproduce a rectangular signal waveform that is shaped better than the signal waveform obtained in Example 1.

EXAMPLE 3

The magneto-optical recording medium of this example is identical with that of Example 1 except that the composition of the domain wall displacement layer, that of the switching layer and that of the recording layer were different from those of the specimen of Example 1. More specifically, a composition of $Tb_{0.19}Fe_{0.73}Al_{0.08}$ was used for the switching layer so as to make its Curie temperature Ts equal to about 130° C. and a composition of $Gd_{0.22}Fe_{0.61}Co_{0.10}Al_{0.07}$ was used for the domain wall displacement layer to make its Curie temperature Ts equal to about 260° C. and transition metal sublattice magnetization become dominant at and near the Curie temperature Ts (130° C.) of the switching layer, whereas $Tb_{0.25}Fe_{0.52}Co_{0.23}$ was used for the recording layer to make its Curie temperature Ts equal to about 320° C. and rare earth sublattice magnetization become dominant at and near the Curie temperature Ts (130° C.) of the switching layer.

The magneto-optical medium of this example was evaluated for signal reproduction as in the case of Example 1 to find that it could reproduce a rectangular signal waveform with a greater amplitude as compared with the specimens of Examples 1 and 2.

What is claimed is:

1. A domain wall displacement magneto-optical recording medium for irradiation with a light spot to form a temperature distribution therein which displaces domain walls and expands recorded domains for reproducing recorded information comprising:

a domain wall displacement layer having a Curie temperature higher than a peak temperature for displacing said domain walls;

a recording layer for storing information; and a switching layer arranged between said domain wall displacement layer and said recording layer and having a Curie temperature lower than those of the latter two layers, wherein said domain wall displacement layer has a smaller domain wall coercivity than said recording layer, wherein said domain wall displacement layer, said switching layer and said recording layer are coupled by exchange coupling such that the magnetization of said domain wall displacement layer corresponds to the magnetization of said recording layer at a temperature not higher than the Curie temperature of said switching layer and wherein when the domain wall displacement layer and the recording layer are coupled by exchange coupling at a temperature close to the Curie temperature of the switching layer, the saturation magnetization of said domain wall displacement layer is in opposite direction to the saturation magnetization of said recording and switching layers.

2. A recording medium according to claim 1, wherein said domain wall displacement layer is formed so that its rare earth sublattice magnetization becomes dominant at and near the Curie temperature of said switching layer, while said recording layer is formed so that its transition metal sublattice magnetization becomes dominant at and near the Curie temperature of said switching layer.

3. A recording medium according to claim 2, wherein said domain wall displacement layer shows a compensation temperature between its own Curie temperature and the Curie temperature of said switching layer.

4. A recording medium according to claim 1, wherein said domain wall displacement layer is formed so that its transition metal sublattice magnetization becomes dominant at and near the Curie temperature of said switching layer, while said recording layer is formed so that its rare earth sublattice magnetization becomes dominant at and near Curie temperature of said switching layer.

5. A reproducing method to be used with a magneto-optical recording medium according to any of claims 1 through 4, said method comprising:

a step of forming a predetermined temperature distribution having a temperature zone exceeding the Curie temperature of said switching layer on said magneto-optical recording medium by means of a laser beam;

a step of breaking the exchange coupling between said domain wall displacement layer and said recording layer in a region of the temperature zone exceeding the Curie temperature of said switching layer and displacing a domain wall formed in said domain wall displacement layer toward the high temperature side along the temperature gradient of the temperature distribution; and a step of detecting information stored in said recording layer, utilizing the laser beam reflected from said medium.

* * * * *